United States Patent
Griesbach

(10) Patent No.: US 12,088,157 B2
(45) Date of Patent: Sep. 10, 2024

(54) SHAFT GROUNDING DEVICE AND ELECTRIC DRIVE UNIT COMPRISING SUCH A DEVICE

(71) Applicant: ZF Friedrichshafen AG, Friedrichshafen (DE)

(72) Inventor: Michael Griesbach, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 231 days.

(21) Appl. No.: 17/794,654

(22) PCT Filed: Jan. 22, 2021

(86) PCT No.: PCT/EP2021/051402
§ 371 (c)(1),
(2) Date: Jul. 22, 2022

(87) PCT Pub. No.: WO2021/148579
PCT Pub. Date: Jul. 29, 2021

(65) Prior Publication Data
US 2023/0078270 A1    Mar. 16, 2023

(30) Foreign Application Priority Data
Jan. 23, 2020   (DE) ............... 10 2020 200 821.3

(51) Int. Cl.
*H02K 11/40*   (2016.01)
*F16C 19/52*   (2006.01)
*H02K 5/173*   (2006.01)

(52) U.S. Cl.
CPC .............. *H02K 11/40* (2016.01); *F16C 19/52* (2013.01); *H02K 5/1732* (2013.01)

(58) Field of Classification Search
CPC ..................................................... H02K 11/40
See application file for complete search history.

(56) References Cited

U.S. PATENT DOCUMENTS

| 2,623,188 A | 12/1952 | Le Tourneau et al. |
| 2,774,898 A | 12/1956 | Le Tourneau |
| 4,063,786 A | 12/1977 | Rall |

(Continued)

FOREIGN PATENT DOCUMENTS

| DE | 102012025133 A1 | 6/2014 |
| DE | 102015101876 A1 | 8/2016 |

(Continued)

OTHER PUBLICATIONS

International Search Report (English Translation) PCT/EP2021/051402, dated Apr. 23, 2021. (2 pages).

(Continued)

*Primary Examiner* — Robert W Horn
(74) *Attorney, Agent, or Firm* — Dority & Manning, P.A.

(57) ABSTRACT

A shaft grounding device (X) for the electrical grounding of a shaft (1) with respect to a housing (2) includes an electrically conductive rectangular ring (4) arranged in a rectangular groove (3) formed in the shaft (1). The rectangular ring (4) is in electrically conductive contact with the housing (2) via a metallic sleeve (5). A preloading device presses the rectangular ring (4) axially against the rectangular ring groove (3) and radially outward against the sleeve (5).

12 Claims, 2 Drawing Sheets

(56) References Cited

U.S. PATENT DOCUMENTS

| | | | |
|---|---|---|---|
| 4,275,376 A | 6/1981 | Alexander et al. | |
| 6,608,410 B2 | 8/2003 | Sato et al. | |
| 11,365,807 B2 * | 6/2022 | Ito | F16J 15/3208 |
| 11,635,133 B2 * | 4/2023 | Griesbach | F16H 57/021 |
| | | | 277/559 |
| 2011/0149459 A1 | 6/2011 | Baumann | |
| 2021/0351671 A1 * | 11/2021 | Yim | H02K 11/40 |
| 2022/0145936 A1 * | 5/2022 | Sato | F16C 19/527 |
| 2023/0078270 A1 * | 3/2023 | Griesbach | H02K 5/1732 |
| | | | 310/71 |
| 2023/0261555 A1 * | 8/2023 | Arnault | H02K 11/40 |
| | | | 310/71 |
| 2024/0097536 A1 * | 3/2024 | Zhou | H02K 5/1732 |

FOREIGN PATENT DOCUMENTS

| | | | | |
|---|---|---|---|---|
| DE | 102017205418 B3 * | 8/2018 | | |
| DE | 102021211082 A1 * | 4/2023 | | F16C 35/042 |
| EP | 0039657 A1 | 11/1981 | | |
| WO | WO-2022258309 A1 * | 12/2022 | | B60K 1/00 |

OTHER PUBLICATIONS

German Search Report DE 10 2020 200 821.3, dated Dec. 18, 2020. (10 pages).

* cited by examiner

SHAFT GROUNDING DEVICE AND ELECTRIC DRIVE UNIT COMPRISING SUCH A DEVICE

CROSS-REFERENCE TO RELATED APPLICATION

The present application is related and claims priority to 102020200821.3 filed in the German Patent Office on Jan. 23, 2020 and is a U.S. national phase of PCT/EP2021/051402 filed in the European Patent Office on Jan. 22, 2021, both of which are incorporated by reference in their entirety for all purposes.

FIELD OF THE INVENTION

The present invention relates generally to a shaft grounding device for the electrical grounding of a shaft with respect to a housing. The invention further relates generally to a transmission for a motor vehicle including a shaft grounding device of this type.

BACKGROUND

Shaft grounding devices are generally utilized in electrified drive trains of motor vehicles such as, for example, in hybrid drives or in electrically driven axles, and are utilized for dissipating electric alternating currents from electrically conductive components, such as input shafts and output shafts of transmissions and rotors in order, in this way, to avoid damage due to the current flow at components such as, for example, bearings, and/or to reduce the formation of electromagnetic emission from the shafts. In this connection, it is necessary to keep the electrical resistance—also referred to as impedance—between the rotating component—the shaft—and the stationary housing, in which a shaft is arranged, as low as possible.

It is known from the prior art to utilize contacts in the form of carbon brushes, coated electrically conductive plastics or non-wovens to implement the contacting necessary between a stationary shaft grounding device and a rotating shaft. In order to keep the contact resistance as low as possible, a larger contact area of the contacting on the shaft is necessary.

It is known from U.S. Pat. No. 6,608,410 B2, with respect to a rotor shaft arranged in a housing, to dissipate currents via an electrically conductively designed sealing element to the shaft and the housing in order to implement a grounding function.

SUMMARY OF THE INVENTION

Example aspects of the present invention provide an alternative shaft grounding device.

A shaft grounding device is provided for the electrical grounding of a shaft with respect to a housing, wherein an electrically conductive rectangular ring, which is arranged in a rectangular groove formed in the shaft, is provided for establishing an electrical contact to the shaft. The rectangular ring is in electrically conductive contact with the housing via a metallic sleeve.

Example aspects of the invention are based on the concept of utilizing the principle of a rectangular ring known for sealing a shaft for the purpose of grounding a shaft. Due to the additional preloading device, the electrically conductive contact between the shaft and the rectangular ring is ensured.

According to one example embodiment of the invention, the preloading device includes a piston designed to be wedge-shaped and a spring element, in particular a radially preloaded base spring, which are arranged in the rectangular ring groove. The base spring presses the piston against the rectangular ring, which, in turn, presses the rectangular ring, at rest, axially against the rectangular ring groove and, due to the wedge shape, radially outward against the sealing sleeve and the bearing.

In order to integrate the necessary components, piston and base spring, an enlargement of existing rectangular ring grooves is necessary.

Due to the design according to example aspects of the invention, the advantage is achieved that the rectangular ring always has a preload with respect to the shaft, in particular with respect to the shaft shoulder, and with respect to the sleeve, which, in connection with the electrically conductive design of the rectangular ring, is a precondition for dissipating currents between the shaft via the rectangular ring, via the sleeve, and to the housing.

Since the sleeve is generally pressed into the housing, the current can flow very easily at the housing to ground. Yet another advantage of example aspects of the invention is that only two additional components are needed in comparison to the prior art, namely the base spring and the piston, which results in low manufacturing and assembly costs. Moreover, the installation space necessary for the installation of the base spring and the piston is very small.

According to one example refinement of the invention, it can be provided that the rectangular ring is designed to be silver-coated in order to keep the contact resistance as low as possible, wherein the costs therefor are advantageously low, since the silver coating is limited to a relatively small component.

Preferably, the rectangular ring operates as an oil sealing ring in addition to functioning as the shaft grounding device. Due to a design of this type, a seal that is otherwise additionally necessary can be dispensed with.

Moreover, an electric drive unit for a motor vehicle is provided, wherein the electric drive unit includes a housing and a shaft mounted in the housing. The electric drive unit can include a shaft grounding device according to one of the aforementioned example embodiments in order to provide an electrically conductive contact between the housing and the shaft.

The electric drive unit can be, for example, an electric axle drive for a motor vehicle. Alternatively, the electric drive unit can be formed by a transmission, which includes an electric machine for the vehicle drive, for example, an automatic transmission or a dual-clutch transmission.

According to one possible example embodiment, the shaft grounding device is arranged in an oil chamber of the electric drive unit. An oil chamber is a chamber of the electric drive unit, in which oil is located, for example, for lubricating and/or for cooling components of the electric drive unit. In an example embodiment of this type, the rectangular ring of the shaft grounding device can operate as a sealing ring for sealing the oil chamber.

If the shaft grounding device of the electric drive unit includes the aforementioned wedge-shaped piston, the piston is preferably aligned such that a pressure acting in the oil chamber acts upon the piston in order to intensify the sealing effect of the rectangular ring.

Alternatively, the shaft grounding device can be arranged in a dry space of the electric drive unit.

BRIEF DESCRIPTION OF THE DRAWINGS

Example aspects of the invention are explained in greater detail in the following, by way of example, with reference to the attached figures, wherein.

DETAILED DESCRIPTION

Figure 1:
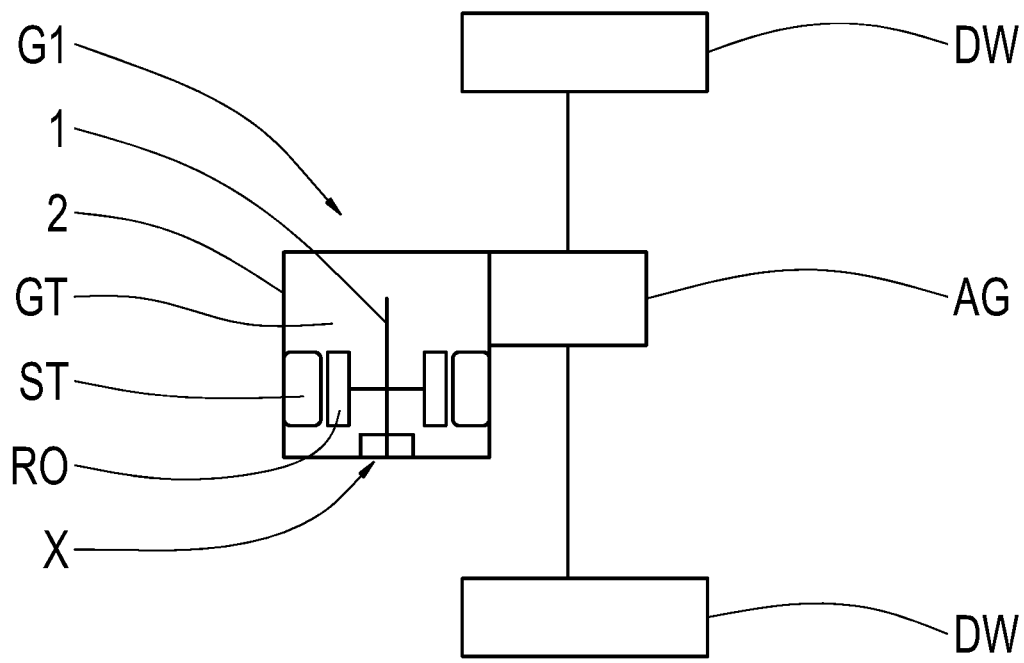
FIG. 1 and FIG. 2 each show a drive train of a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a drive train of a motor vehicle including an electric drive unit G1. The electric drive unit G1 includes an electric machine having a rotationally fixed stator ST and a rotary rotor RO. The stator ST is secured at a housing 2. The rotor RO is secured on a shaft 1, which is mounted in the housing 2. Via a transmission not represented in FIG. 1, the power applied at the rotor RO is transmitted onto a differential gear AG, which splits the power onto driving wheels DW of the motor vehicle.

During the operation of the electric machine, currents can be coupled into the rotor RO, which are electrically insulated with respect to the housing 2 due to the mounting of the shaft 1. In order to ensure a return conducting path of these currents, the electric drive unit G1 includes a shaft grounding device X. Due to the shaft grounding device X, an electrically conductive contact is established between the shaft 1 and the housing 2. The shaft grounding device X is arranged, by way of example, in a dry space GT of the electric drive unit G1.

Figure 2:
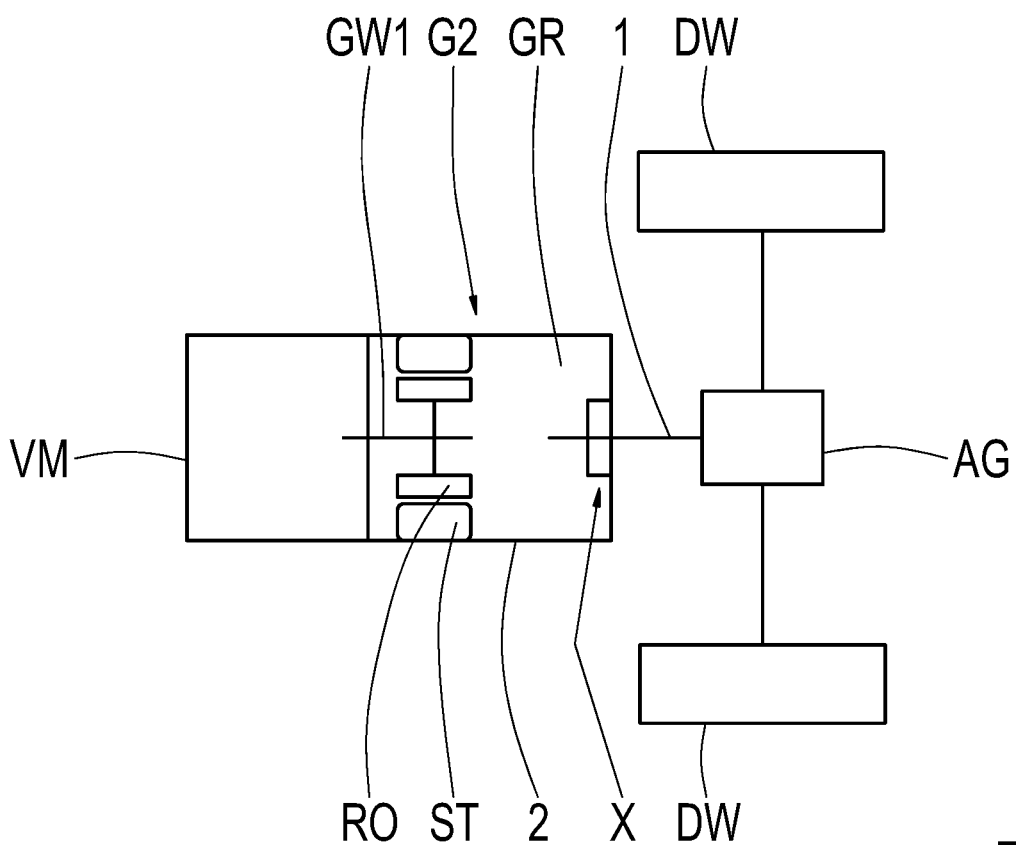

FIG. 2 shows a drive train of a motor vehicle including an electric drive unit G2. The drive train is now designed as a hybrid drive train. The electric drive unit G2 is formed by a transmission, which is connected on the input side to an internal combustion engine VM. The transmission includes a gear set (not represented in FIG. 2) in order to provide different transmission ratios between an input shaft GW1 and a shaft 1. The transmission includes an electric machine having a rotor RO and a stator ST, wherein the stator ST is connected to a housing 2 of the electric drive unit G2 and the rotor RO is connected to the input shaft GW1. On the output side, the transmission is connected via a shaft 1 to a differential gear AG. The differential gear AG is configured for distributing the power applied at the shaft 1 to driving wheels DW of the motor vehicle.

During the operation of the electric machine, currents can be coupled into the rotor RO, which are electrically insulated with respect to the housing 2 due to the mounting of the shafts GW1, 1. In order to ensure a return conducting path of these currents, the electric drive unit G2 includes a shaft grounding device X. Due to the shaft grounding device X, an electrically conductive contact is established between the shaft 1 and the housing 2. The shaft grounding device X is arranged, by way of example, in an oil chamber GR of the electric drive unit G2.

The drive trains and electric drive units G1, G2 shown in FIG. 1 and FIG. 2 are to be considered merely as examples.

Figure 3:
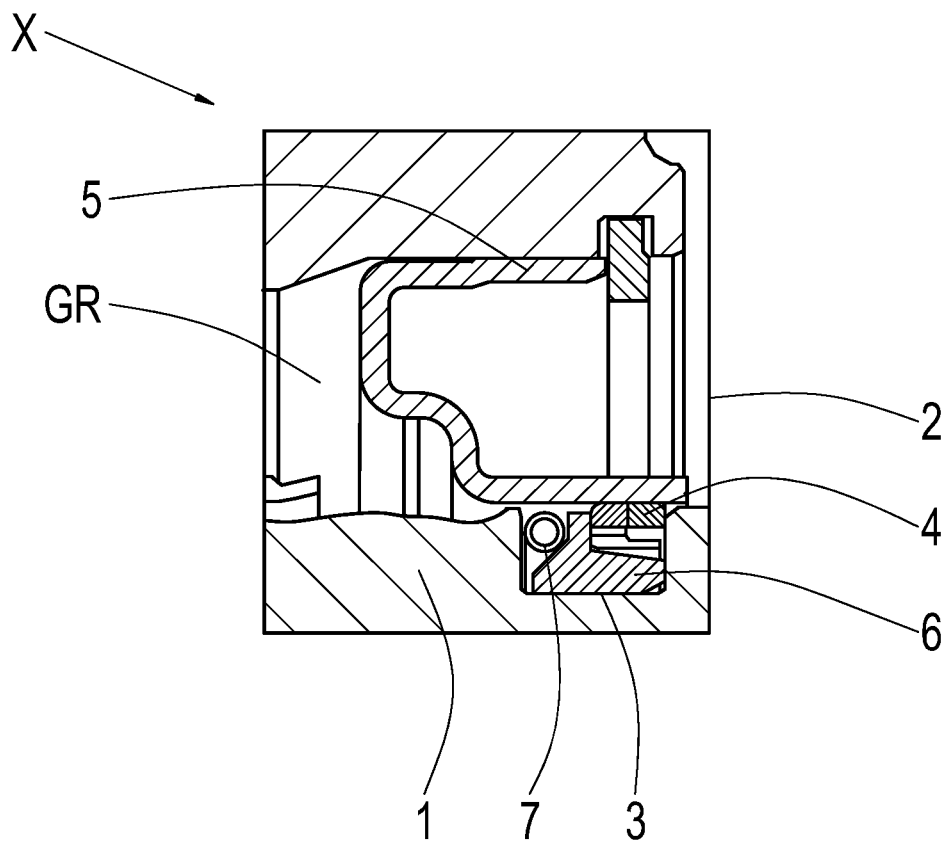
FIG. 3 shows a diagrammatic sectional view of a shaft grounding device in the installed state.

FIG. 3 shows a diagrammatic sectional view of a shaft grounding device X for the electric drive unit G2. The oil chamber GR is sealed with respect to the housing 2 and the shaft 1 via a rectangular ring 4, which is designed to be electrically conductive and is arranged in a rectangular ring groove 3 formed in the shaft 1, wherein, in order to achieve a sealing effect, the rectangular ring 4 is pressable by the oil pressure axially onto the rectangular ring groove 3, in particular a shaft shoulder, and radially outward against a sleeve 5 made of metal.

According to example aspects of the invention, the shaft grounding device X includes a preloading device, which presses the rectangular ring 4—also when the shaft 1 is at a standstill—axially against the rectangular ring groove 3 and radially outward against the sleeve 5, wherein, in the example shown in FIG. 3, the preloading device includes a piston 6 designed to be wedge-shaped and a radially preloaded base spring 7, which are arranged in the rectangular ring groove 3. The rectangular ring 4 can be designed to be silver-coated in order to keep the contact resistance as low as possible.

The piston 6 is pressed against the rectangular ring 4 by the force of the base spring 7, wherein, as a result, when the shaft 1 is at a standstill, the rectangular ring 4 is pressed axially against the rectangular ring groove 3 and, due to the wedge shape of the piston 6, radially outward against the sleeve 5, and so the preload of the rectangular ring 4 with respect to the shaft 1 and the sleeve 5, which is necessary for dissipating current, is ensured.

Figure 4:
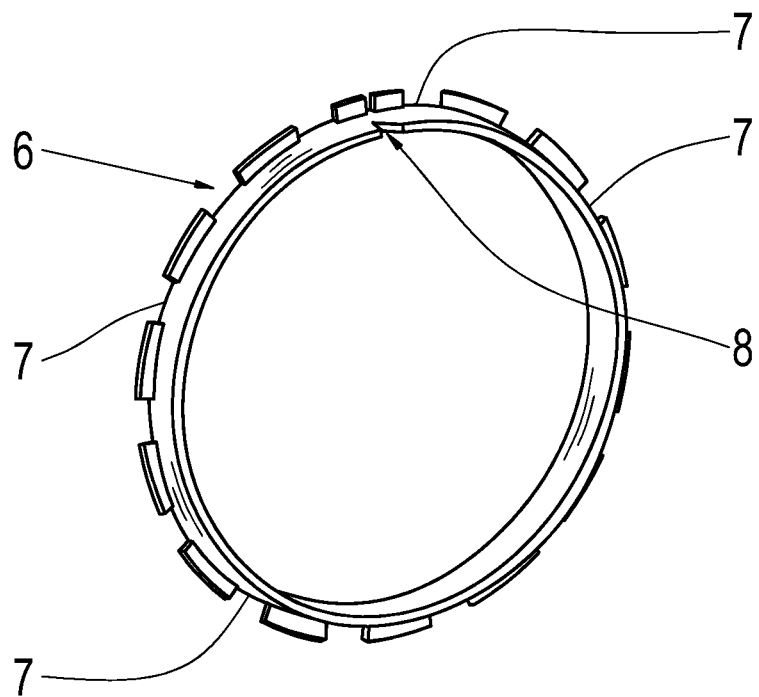
FIG. 4 shows a perspective view of a piston of the shaft grounding device.

The subject matter of FIG. 4 is a piston 6 of the preloading device of the shaft grounding device X. As is apparent from FIG. 4, on the side facing away from the rectangular ring 4 in the installed state, the piston 6 has grooves 8 distributed over the circumference, which, during operation, make it possible for oil to enter the rectangular ring groove 3, as the result of which the rectangular ring 4 is pressed axially onto the rectangular ring groove 3 and radially outward against the sleeve 5 in order to achieve the sealing effect.

Moreover, the piston 6 in the example shown has an opening 9 for enabling and simplifying installation; according to further example embodiments, the piston can be composed of two parts.

The shaft grounding device X according to FIG. 3 and FIG. 4 can also be utilized in the electric drive unit G1 such that the shaft grounding device X is arranged in the dry space GT of the electric drive unit G1. A hydraulic preloading of the rectangular ring 4 is therefore dispensed with.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

G1, G2 electric drive unit
ST stator

RO rotor
AG differential gear
DW driving wheel
VM internal combustion engine
GW1 input shaft
GR oil chamber
GT dry space
X shaft grounding device
1 shaft
2 housing
3 rectangular ring groove
4 rectangular ring
5 sealing sleeve
6 piston
7 base spring
8 groove
9 opening

The invention claimed is:

1. A shaft grounding device (X) for electrical grounding of a shaft (1) with respect to a housing (2), comprising:
   an electrically conductive rectangular ring (4) arranged in a rectangular groove (3) formed in the shaft (1),
   a metallic sleeve (5), the rectangular ring (4) in electrically conductive contact with the housing (2) via the metallic sleeve (5); and
   a preloading device pressing the rectangular ring (4) axially against the rectangular ring groove (3) and radially outward against the sleeve (5).

2. The shaft grounding device (X) of claim 1, wherein the rectangular ring (4) is silver-coated.

3. The shaft grounding device (X) of claim 1, wherein the preloading device comprises:
   a piston (6) that is wedge-shaped; and
   a radially preloaded base spring (7),
   wherein the piston (6) and the base spring (7) are arranged in the rectangular ring groove (3), and the base spring (7) presses the piston (6) against the rectangular ring (4) such that the rectangular ring (4) is pressed axially against the rectangular ring groove (3) and radially outward against the sleeve (5) by the wedge-shape of the piston (6).

4. The shaft grounding device (X) of claim 3, wherein the piston (6) defines an installation opening (9).

5. The shaft grounding device (X) of claim 3, wherein the piston (6) is a one-piece piston or a two-piece piston.

6. The shaft grounding device (X) of claim 1, wherein the rectangular ring (4) is additionally configured as an oil sealing ring.

7. The shaft grounding device (X) of claim 6, wherein:
   on a side facing away from the rectangular ring (4) in an installed state, a piston (6) defines grooves (8) distributed over a circumference of the piston (6);
   the grooves (8) configured for allowing oil to enter the rectangular ring groove (4) such that the rectangular ring (4) is pressed axially onto the rectangular ring groove (3) and radially outward against the sleeve (5) for a seal.

8. An electric drive unit (G1, G2) for a motor vehicle, comprising:
   a housing (2);
   a shaft (1) mounted in the housing (2); and
   the shaft grounding device (X) of claim 1,
   wherein an electrically conductive contact is established between the housing (2) and the shaft (1) by the shaft grounding device (X).

9. The electric drive unit (G2) of claim 8, wherein the shaft grounding device (X) is arranged in an oil chamber (GR) of the electric drive unit (G2).

10. The electric drive unit (G2) of claim 9, wherein the rectangular ring (4) of the shaft grounding device (X) operates as a sealing ring for sealing the oil chamber (GR).

11. The electric drive unit (G2) of claim 10, wherein:
    the preloading device comprises a piston (6) that is wedge-shaped and a radially preloaded base spring (7), the piston (6) and the base spring (7) are arranged in the rectangular ring groove (3), and the base spring (7) presses the piston (6) against the rectangular ring (4) such that the rectangular ring (4) is pressed axially against the rectangular ring groove (3) and radially outward against the sleeve (5) by the wedge-shape of the piston (6); and
    the piston (6) is configured such that a pressure prevailing in the oil chamber (GR) acts on the piston (6) to increase a sealing effect of the rectangular ring (4).

12. The electric drive unit (G1) of claim 8, wherein the shaft grounding device (X) is arranged in a dry space (GT) of the electric drive unit (G1).

* * * * *